United States Patent

[11] 3,597,998

[72] Inventor Heinrich Ebert
 Furth, Bavaria, Germany
[21] Appl. No. 783,888
[22] Filed Dec. 16, 1968
[45] Patented Aug. 10, 1971
[73] Assignee David Brown Gear Industries Limited

[54] POWER TRANSMISSION MECHANISM
 12 Claims, 1 Drawing Fig.
[52] U.S. Cl. .................................................. 74/687,
 60/53 A
[51] Int. Cl. ................................................ F16h 47/04
[50] Field of Search ........................................... 60/53 A;
 74/687

[56] References Cited
 UNITED STATES PATENTS
3,055,233 9/1962 Giles ........................... 74/687
3,212,358 10/1965 DeLalio ....................... 74/687
3,074,296 1/1963 Ebert .......................... 60/53 A X
3,122,025 2/1964 Mark et al. ................... 60/53 A UX
3,123,975 3/1964 Ebert .......................... 60/53 A
3,131,580 5/1964 Forster ....................... 60/53 A UX Primary Examiner—Edgar W. Geoghegan
Attorney—Norris & Bateman ABSTRACT: A mechanical transmission and a hydrostatic transmission both drivable by a power unit and interconnected to drive a common hollow output shaft in such a manner that torque may be transmitted wholly by the mechanical transmission or partly by the mechanical transmission and partly by the hydrostatic transmission in varying proportions or wholly by the hydrostatic transmission, and a power takeoff shaft drivably connected to the power unit coaxial to both the input shaft and the hollow output shaft.

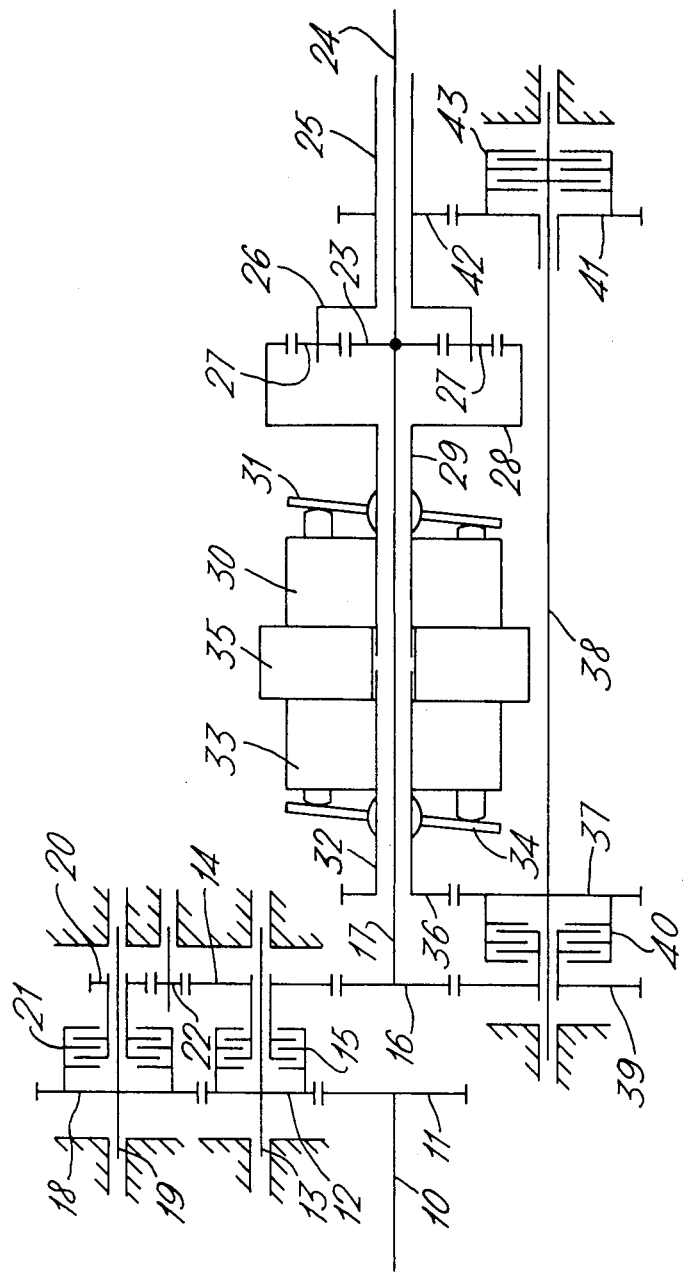
INVENTOR
HEINRICH EBERT

POWER TRANSMISSION MECHANISM

BACKGROUND OF THE INVENTION

The invention relates to an infinitely variable ratio power transmission mechanism of the type which includes or consists of a hydrostatic drive assembly.

Hitherto, where a power takeoff shaft rotatable at a speed proportional to that of the prime mover has been provided in a mechanism of the type referred to, said shaft has been a relatively long one passing through or bypassing the hydrostatic drive assembly.

SUMMARY OF THE INVENTION

The object of the present invention is to provide a mechanism of the type referred to with a relatively short power takeoff shaft.

According to the invention, a power transmission mechanism of the type referred to comprises a driving shaft drivably connected at one end to a prime mover and at the other end to a hydrostatic drive assembly surrounding said shaft and to a power takeoff shaft.

The expression "single epicyclic gear" is used herein to define an epicyclic gear train comprising three essential members, namely two coaxial gears and a planet carrier, and all references herein to clockwise and anticlockwise rotation assume that the mechanism is viewed from its input end.

DESCRIPTION OF THE INVENTION

A preferred embodiment of the invention will now be described, by way of example only, with reference to the diagrammatic drawing, which shows an infinitely variable ratio power transmission mechanism for an agricultural tractor.

Referring now to the drawing, an input shaft 10 is adapted to be driven from a prime mover and which always rotates in a clockwise direction carries a toothed pinion 11 which meshes with a toothed wheel 12 carried by a countershaft 13. A toothed pinion 14 is freely rotatable on the shaft 13 and is capable of being drivably connected to said shaft by a forward drive clutch 15. The pinion 14 meshes with a toothed gear 16 carried by a driving shaft 17 coaxial with the input shaft 10. The wheel 12 meshes with a toothed pinion 18 carried by a reverse shaft 19. A toothed wheel 20 is freely rotatable on the shaft 19 and is capable of being drivably connected thereto by a reverse drive clutch 21. An idler gear 22 meshes with both the pinion 14 and the wheel 20.

At its end remote from the gear 16, the driving shaft 17 carries a toothed sunwheel 23 forming one member of a single epicyclic gear. A power takeoff shaft 24 is drivably connected to said end of the driving shaft 17. An output sleeve 25 surrounding the power takeoff shaft 24 carries a planet carrier 26 forming another member of the single epicyclic gear. Toothed planets 27 freely rotatable in the planet carrier mesh with the sunwheel 23 and with a toothed annulus or ring gear 28 forming the third member of the single epicyclic gear and carried by a sleeve 29 surrounding a portion of the driving shaft 17. Secured on the sleeve 29 is the body of a pump or motor unit 30 of axial piston type having a swashplate 31 of variable angle. Another portion of the driving shaft 17, adjacent the gear 16, is surrounded by a sleeve 32 on which is secured the body of another pump or motor unit 33 of axial piston type having a swashplate 34 also of variable angle. The units 30 and 33 are connected in a closed hydraulic circuit by a rotationally fixed distributor block 35, and the power takeoff shaft 24 passes neither through nor around them.

At its end adjacent the gear 16, the sleeve 32 carries a toothed pinion 36 which meshes with a toothed wheel 37 carried by an intermediate shaft 38. A toothed wheel 39 meshing with the gear 16 is freely rotatable on the shaft 38 and capable of being drivably connected thereto by a clutch 40. A toothed pinion 41 meshing with a toothed wheel 42 carried by the output sleeve 25 is freely rotatable on the intermediate shaft 38 and capable of being drivably connected thereto by a clutch 43.

The relative dimensions of certain of the toothed gears are, for example, as follows:

The ratio of the pitch circle diameter of the pinion 36 to that of the wheel 37, the ratio of the pitch circle diameter of the pinion 41 to that of the wheel 42 and the ratio of the pitch circle diameter of the gear 16 to that of the toothed wheel 39, is $1:\sqrt{3}$. The ratio of the pitch circle diameter of the planets 27 to that of the sunwheel 23 is 1:2.

In operation, the tractor engine is governed so as not to exceed a maximum speed of, for example, 2,200 r.p.m., and the reverse gearing 11, 12, 14, 16, 18, 20 and 22 is so designed that the driving shaft 17 then has a maximum speed of 3,000 r.p.m. both when rotating in a clockwise direction due to engagement of the forward drive clutch 15 and when rotating in the opposite direction due to engagement of the reverse drive clutch 21.

When the tractor is required to move forwards, the clutch 15 is engaged and the clutch 21 disengaged. Conversely, when the tractor is required to move rearwards, the clutch 21 is engaged and the clutch 15 disengaged.

When the tractor is about to move off from rest in either direction, the clutch 43 is engaged, the clutch 40 is disengaged, the swashplate 34 is at its maximum inclination, and the swashplate 31 is at zero inclination. The unit 30 functions as a pump and the unit 33 as a motor. Assuming that the forward drive clutch 15 is engaged, the driving shaft 17 and thus the sunwheel 23 rotate in a clockwise direction while the output sleeve 25, and thus the planet carrier 26 and the unit 33, are stationary. The annulus 28 and the unit 30 therefore rotate at half the speed of the driving shaft 17 and in an anticlockwise direction. As the swashplate 31 is at zero inclination no oil is pumped to the unit 33 so that no torque is applied by said unit to the output sleeve 25 via the sleeve 32, pinion 36, wheel 37, shaft 38, clutch 43, pinion 41 and wheel 42. The inclination of the swashplate 31 then commences to be increased, as a result of which the unit 30 absorbs torque in proportion to the tangent of the angle by which said swashplate 31 is displaced from its zero inclination position, and oil is pumped from the unit 30 to the unit 33 which is accordingly caused to transmit to the output sleeve 25 via the sleeve 32, pinion 36, wheel 37, shaft 38, clutch 43, pinion 41 and wheel 42 a torque equal in value to that absorbed by the unit 30. When the inclination of the swashplate 31 reaches its maximum, the unit 30 is absorbing, and the unit 33 is transmitting, twice the torque applied to the driving shaft 17, and the unit 33 is rotating in a clockwise direction at three times the speed of the output sleeve 25 whilst the unit 30 is rotating at one-third the speed of the driving shaft 17 and in the opposite direction to the unit 33. One unit of torque applied to the driving shaft 17 produces three units of clockwise torque on the output sleeve 25 via the planet carrier 26 and, as previously implied, two units of anticlockwise torque on the annulus 28 which is drivably connected to the unit 30. The two units of clockwise torque applied to the sleeve 32 by the unit 33 are multiplied by the reduction gearing 36, 37, 41 and 42 to produce a further six units of clockwise torque on the output sleeve 25. Thus the sum of the torque units applied to said sleeve is 9, that is to say the output sleeve 25 is rotating at one-ninth the speed of the driving shaft 17 and in a clockwise direction, the drive being partly mechanical and partly hydraulic.

The inclination of the swashplate 34 then commences to be reduced, as a result of which the unit 30 continues to absorb two units of torque but the unit 33 applies to the sleeve 32 a torque proportional to the tangent of the angle by which the swashplate 34 is displaced from its zero inclination position. When the inclination of the swashplate 34 becomes zero, the unit 33 is unable to accept any oil from the unit 30 and hydraulic lock occurs, that is to say the unit 33 is rotating at the same speed and in the same direction as the driving shaft 17 but transmits no torque whilst the unit 30 is stationary although it is still subjected to two units of anticlockwise torque. When the swashplate 34 is in its zero inclination position, it is immaterial whether neither, either one, or both of the clutches 40 and 43 is or are engaged. The stationary unit 30 holds the annulus 28 stationary, as a result of which three units of clockwise torque are applied by the sunwheel 23 to the planet carrier 26 and thus to the output sleeve 25 which accordingly rotates at one-third the speed of the driving shaft 17. At this speed ratio the drive is purely mechanical, and much of the work of the tractor can be performed at this ratio with maximum efficiency due to nonuse of the hydrostatic path.

When the ratio of output sleeve speed to driving shaft speed is required to be greater than 1:3 in either direction of motion of the vehicle, the clutch 40 must be engaged and the clutch 43 disengaged. The unit 33 then rotates at the same speed and in the same direction as the driving shaft 17 and functions as a pump, while the unit 30 functions as a motor. It is again assumed that the forward drive clutch 15 is engaged. The inclination of the swashplate 34 then commences to be increased again, as a result of which the torque absorbed by the unit 33 increases from zero and the unit 30 is caused to transmit a torque equal in value to that absorbed by the unit 33. It should be noted that when the ratio of output sleeve speed to driving shaft speed is less then 1:3 the single epicyclic gear is a power splitter and the torques applied to the members of said gear are fixed, being, as previously mentioned, one unit on the sunwheel 23, three units on the planet carrier 26 and two units on the annulus 28. However, for a ratio greater than 1:3, the engagement of clutch 40 instead of clutch 43 results in the single epicyclic gear acting merely as a speed splitter, and the torque on the gear 16 is divided between the sleeve 32 and the shaft 38 by the gearing 39, 37 and 36 in accordance with the speed of the single epicyclic gear. Thus when the inclination of the swashplate 34 reaches its maximum, the torque delivered by the driving shaft 17 is one-third of the torque on the gear 16 and the torque absorbed by the unit 33 is two-thirds of the torque on said gear. Both of the units 30 and 33 are rotating at the same speed and in the same direction as the driving shaft 17, and the torque transmitted by the unit 30 to the annulus 28 is the same as that absorbed by the unit 33. Thus, given one unit of torque on the gear 16, there is one-third of a unit of clockwise torque on the sunwheel 23 and two-thirds of a unit of clockwise torque on the annulus 28, and the torque applied to the planet carrier 26 and thus to the output sleeve 25 is therefore one unit, that is to say that the output sleeve speed is the same as the driving shaft speed and the drive is again partly mechanical and partly hydraulic.

The principle of operation when the the reverse drive clutch 21 is engaged is exactly the same as described in the preceding three paragraphs except that the directions of rotation and of torque application are reversed in the case of all the rotatable components except the shafts 10, 13 and 19. Downward changes in gear ratio in either direction of motion of the tractor are accomplished by reversing the sequence of operations, and the direction of angular movement of the swashplates 31 and 34, described above. That is to say, in order to bring the tractor to a halt from its maximum speed it is necessary to move the swashplate 34 to its zero inclination position, disengage the clutch 40 and engage the clutch 43, move the swashplate 34 back to its maximum inclination position, and move the swashplate 31 to its zero inclination position.

In a modification, each of the units 30 and 33 is replaced by a bank of two or more pump or motor units, the driving shaft 17 passing coaxially through one unit in each bank.

In another modification, the gear 20 meshes directly with the gear 16 to provide a reverse drive.

Mechanism according to the invention are suitable for trucks and stationary drives as well as for agricultural tractors.

What I claim is:

1. A power transmission mechanism comprising a driving shaft, means for operably drive connecting one end of said driving shaft to a prime mover, a hydrostatic drive assembly surrounding said driving shaft which passes therethrough, a power takeoff shaft, means drivably connecting the other end of said driving shaft directly to said power takeoff shaft, an output shaft, means comprising a single epicyclic gear drivably connecting said other end of said driving shaft to said hydrostatic drive assembly and to said output shaft, and means for drivably connecting said hydrostatic drive assembly to said output shaft.

2. A power transmission mechanism according to claim 1, comprising means for varying drive torque transmitted to the output shaft by said hydrostatic drive assembly whereby power for varying to said output shaft is controllably divisible between a mechanical power path and a hydrostatic power path.

3. A power transmission mechanism according to claim 2, provided with means for causing a state of lock in the hydrostatic path, and thus a purely mechanical output drive at an intermediate gear ratio between the high and low limits of the range of gear ratios obtainable from the mechanism.

4. In the power transmission mechanism defined in claim 1, said output shaft comprising a rotatable sleeve surrounding said power takeoff shaft, and said epicyclic gear comprising a sun gear rotatable with said driving and power takeoff shafts, a ring gear drivingly connected to said hydrostatic drive assembly, and a planet gear carrier rotatable with said sleeve.

5. A power transmission mechanism comprising a driving shaft, means operably drive connecting one end of said driving shaft to a prime mover, a hydrostatic drive assembly surrounding said driving shaft which passes therethrough, a power takeoff shaft, means drivably connecting the other end of said driving shaft directly to said power takeoff shaft, means comprising a single epicyclic gear drivably connecting said other end of said driving shaft to said hydrostatic drive assembly and comprising means drivably connecting said other end of the driving shaft to one member of said single epicyclic gear, an output shaft drivably connected to a second member of said single epicyclic gear, a first unit of said hydrostatic drive assembly drivably connected to the third member of said single epicyclic gear, a second unit of said hydrostatic drive assembly selectively connectable to said driving shaft by first clutch means and to said output shaft by second clutch means and speed reduction gearing, and a closed hydraulic circuit interconnecting said first and second units of the hydrostatic drive assembly.

6. A power transmitting mechanism as defined in claim 5, wherein said first epicyclic gear member is a sun gear drive connected to said driving shaft, said second epicyclic gear member comprises an associated planet carrier having a sleeve that extends to form said output shaft, and said third epicyclic gear member comprises a toothed annulus having a sleeve surrounding said driving shaft and directly drive connected to said first hydrostatic drive assembly unit.

7. A power transmission mechanism according to claim 5, said second unit of said hydrostatic drive assembly being connectable to said driving shaft by speed-increasing gearing.

8. A power transmission mechanism according to claim 5, wherein each said unit of said hydrostatic drive assembly is of variable capacity.

9. A power transmission mechanism according to claim 5, wherein each said unit of said hydrostatic drive assembly is of an axial-piston swashplate type.

10. A power transmission mechanism according to claim 5, wherein said hydrostatic drive assembly consists essentially of two said units.

11. A power transmission mechanism according to claim 1, wherein said driving shaft is connectable at said one end to an input shaft from the prime mover by reverse gearing.

12. A power transmission mechanism comprising a driving shaft, means operably drive connecting one end of said driving shaft to a prime mover, reverse gearing for connecting an input shaft from said prime mover to said driving shaft, said reverse gearing comprising a first pair of coaxial gears which mesh respectively with a gear on said input shaft and a gear on said driving shaft, a second pair of coaxial gears one of which meshes with one of said first pair of gears, an idler gear which meshes with the other of said second pair of gears, and clutch means for selectively connecting together either, but not both, of said pairs of gears, a hydrostatic drive assembly surrounding said driving shaft which passes therethrough, a power takeoff shaft, means drivably connecting the other end of said driving shaft directly to said power takeoff shaft, and means comprising a single epicyclic gear drivably connecting said other end of said driving shaft to said hydrostatic drive assembly.